United States Patent Office 3,106,568
Patented Oct. 8, 1963

3,106,568
DEHYDRATION OF AROMATIC POLY-
CARBOXYLIC ACIDS
Charles P. Spaeth, Woodbury, N.J., assignor to E. I. du
Pont de Nemours and Company, Wilmington, Del., a
corporation of Delaware
No Drawing. Filed Aug. 18, 1960, Ser. No. 50,326
11 Claims. (Cl. 260—346.3)

The present invention relates to the preparation of anhydrides of aromatic carbocyclic acids containing at least 3 carboxyl groups.

Although several methods, such as dehydration with acetic anhydride, molten dehydration, and dry thermal dehydration are known for the preparation of anhydrides from acids, these methods are not entirely satisfactory. The reaction with acetic anhydride is time consuming and the product requires extensive purification. The molten dehydration of acids at high temperatures often causes charring and discoloration and the resultant anhydride is essentially worthless without further extensive purification. Furthermore, complicated and expensive equipment is required for the handling of the acid in the molten form. Although dry thermal dehydration, i.e., heating the acid in the solid state, as now practiced, represents an improvement over the molten dehydration method, it also has many disadvantages. For example, pure acid must be used or discolored anhydride results and poor yields are obtained. Further, the acid is subject to local overheating with consequent thermal decomposition leading to loss of yield and discoloration of the product. Water-azeotroping agents such as toluene and xylene, have also been used to prepare anhydrides from acids such as maleic acid. However, this method of dehydration is applicable only to acids which can be dehydrated at the low-boiling temperature of the water-organic liquid azeotrope.

I have found that anhydrides can be prepared in high yields and high purity by heating at 200–260° C. aromatic acids having at least three carboxyl groups, at least two of which are in the ortho relationship to each other, in phenyl ether or commercial mixtures of phenyl ether, such as "Dowtherm" A (proprietary name for a eutectic mixture of 76.5% phenyl ether and 23.5% diphenyl) in which phenyl ether is the major component, followed by filtration of the solution to remove impurities. The anhydride crystallizes from the solution upon cooling.

The phenyl ether medium, which is unreactive with organic acids, thermally stable at the dehydration temperature, and a solvent for the anhydride, facilitates the distribution of heat during dehydration, allows the water formed during the process to be distilled out, and dissolves the anhydride as it is being formed.

Phenyl ether becomes viscous as it cools, so that the formation of fine anhydride crystals is hindered. Therefore, an inert hydrocarbon diluent such as benzene, toluene, or a petroleum hydrocarbon is preferably added to the phenyl ether-anhydride mixture as a diluent to cut the viscosity and promote formation of crystals which can then be easily separated by filtration. The diluent also decreases the solubility of the anhydride in the ether. The hydrocarbon can also be used to wash the anhydride free of the phenyl ether. As diluent, any stable hydrocarbon boiling above about 60° and liquid at 20° C. can be used. Ideally the diluent is a good solvent for the phenyl ether but not for the anhydride. Toluene is especially desirable for this purpose.

The following examples illustrate processes of the invention. Unless otherwise designated the parts in the examples are parts by weight.

The anhydride color in the following examples was determined on a Coleman colorimeter. A dilute absolute methanol solution of the anhydride was compared with an absolute methanol blank using a Coleman 8-203 filter at 430 m$\mu$. The color value C was determined by the equation: C=absorbance×100.

Example 1

Crude pyromellitic acid (35 parts) prepared by nitric acid oxidation of durene and containing 33.4% surface water and 8.4% water of hydration was placed in a vessel and 100 parts of hot (50–90° C.) phenyl ether was added. The slurry was stirred and heated to 220° C. within 25–30 minutes while surface water and water of hydration were distilled. The mixture was then heated further to about 250° C. with continued stirring. Anhydride formation started at about 230° C. and was rapid at 238–242° C. As the pyromellitic acid dehydrated, the pyromellitic dianhydride formed dissolved in the hot phenyl ether to give a clear yellow to light amber solution. Heating was continued for about 10 minutes after no further evolution of water was noted. The total heating time was about 55 minutes. The hot solution was filtered through a filter which had been preheated to 230° C., to remove insoluble impurities. The filtrate was cooled while stirring continuously. At about 200° C. pyromellitic dianhydride started to crystallize slowly. At about 100° C., approximately 66 parts of benzene was added and the cooling was continued until the temperature of the mixture was 25° C. Pyromellitic dianhydride was then separated by filtration and washed with approximately 22 parts of benzene. The washed PMDA was heated for about 10 minutes at atmospheric pressure to remove benzene, then heated in a vacuum (80° C./mm.) for 1½ hours to remove the residual solvents. The yield of pyromellitic dianhydride based on crude pyromellitic acid was 95% and the purity of the dianhydride was 99.1%. Dianhydride color as measured on a Coleman colorimeter was 15.

Example 2

The procedure as outlined in Example 1 was followed and the same quantities of components were used except for the fact that 100 parts of toluene was added to the partially cooled reaction mixture as a diluent and wash liquid in place of benzene. The yield of pyromellitic dianhydride was 96.2%, anhydride purity was 99.2% and the color was 15.

Example 3

The procedure as outlined in Example 1 was followed and the same quantities of components were used except for the fact that 100 parts of a petroleum hydrocarbon cut boiling at 60–90° C. was added to the partially cooled reaction mixture as a diluent and wash liquid in place of benzene. The yield of pyromellitic dianhydride was 94.6%, anhydride purity was 100%, and the color was 13.

Example 4

The procedure as outlined in Example 1 was followed except that the phenyl ether used was from a previous run and was recovered from the phenyl ether and benzene mixture for reuse by scrubbing the mixed solvents twice with a 3% aqueous sodium hydroxide solution at reflux temperature, separating the caustic wash by gravity while hot, and recovering the solvents by fractionation. The yield of pyromellitic dianhydride obtained, based on crude pyromellitic acid, using this recycled phenyl ether was 94.5%, anhydride purity was 98.5% and color was 16.

Example 5

The procedure as outlined in Example 1 was followed except that "Dowtherm" A was used instead of solely phenyl ether and 30 parts of dried pyromellitic acid was used. The yield of pyromellitic dianhydride based on crude pyromellitic acid was 94.4%, anhydride purity was 100%, and color was 29.

Example 6

A procedure similar to that described in Example 1 was used to dehydrate trimellitic acid. Dried trimellitic acid (1 part) was heated with 4 parts of phenyl ether for 20 minutes at 220–245° C. The hot solution was not filtered as no solid impurities were present. Benzene was used as the diluent and wash liquid. 4-carboxyphthalic anhydride was obtained in 99% yield based on the trimellitic acid. The anhydride was of 98.7% purity and had a color of 27.

Example 7

Bis(3,4-dicarboxyphenyl)sulfone was dehydrated by using a procedure similar to that described in Example 1 except that one part of the dried sulfone was heated for 30 minutes at 220–251° C. with six parts of phenyl ether. The hot solution was not filtered as no solid impurities were present. A yield of 91.7% white bis(3,4-dicarboxyphenyl)sulfone dianhydride was obtained, which was 98.3% pure.

As can be seen by reference to the foregoing examples, anhydrides are obtained directly from the acid in higher yields and purity than formerly has been possible. The use of a liquid phase process allows essentially more of the acid to react and the fact that the anhydride alone is soluble in the phenyl ether or phenyl ether mixtures allows easy separation from unreacted acid and impurities. Aromatic acids other than those exemplified may be dehydrated by the process of the invention provided they have three or more carboxylic groups at least two of which are adjacent to each other on the ring. Among such acids are hemimellitic, mellitic, mellophanic, prehnitic, and benzene pentacarboxylic acid. The process is particularly advantageous in the preparation of pyromellitic dianhydride.

As was shown in the examples, the pyromellitic dianhydride produced by the process described is of high purity and is obtained in unusually good yields. Along with good yields and high purity, another advantage of the process described above is greatly improved anhydride color. Discoloration of the anhydride can be present even though purity is high and can lead to deleterious effects in the various uses to which pyromelllitic dianhydride is put, e.g., curing epoxy resins. The color of pyromellitic dianhydride obtained by dry thermal dehydration of pyromellitic acid below its melting point generally ranges from 50–75 as measured by the Coleman colorimeter while the color of the anhydride obtained in the present process ranges from 15 to 29.

A major advantage of the proposed process is the feasibility of starting with crude acid since the process combines drying, purification and dehydration in one continuous operation. Generally, the acid used in the dehydration process of the prior art methods had to be relatively pure prior to dehydration. As is apparent, prepurification of the acid is a costly and time consuming operation.

Hot filtration of the phenyl ether and anhydride before crystallization will be eliminated if refined acid is used. When anhydrous acid is used, the dehydration mixture is rapidly heated to the dehydration temperature directly inasmuch as no drying is necessary as for water-acid mixtures.

An economic advantage of the proposed dehydration process is the fact that the phenyl ether easily can be purified and used again as shown in Example 4. There is no significant difference in results when recycled phenyl ether is used in place of unused material.

The phenyl ether/acid ratio varies with each acid but enough phenyl ether should be used so all of the resulting anhydride will go into solution.

The process can be carried out under pressure if desired, but there are no significant yield or quality advantages to offset the added equipment and operating costs of such practice. Similarly, there is no advantage in heating the acid involved in the process to a temperature greatly above its dehydration temperature or in heating the mixture for protracted lengths of time.

I claim:

1. A process for the preparation of an anhydride of an aromatic carboxylic acid containing at least 3 carboxyl groups, at least 2 of said carboxyl groups being adjacent to each other on the aromatic ring, which comprises mixing the acid with phenyl ether to provide a fluid mixture, heating the mixture at a temperature above the dehydration temperature of the acid, distilling water from the mixture as the water is formed by dehydration of the acid, dissolving the anhydride as it is formed in the hot phenyl ether to provide a solution, and thereafter cooling the solution and crystallizing the anhydride therefrom.

2. Process according to claim 1, wherein solid impurities are filtered from the hot phenyl ether-anhydride solution and the anhydride is crystallized from the phenyl ether upon cooling.

3. Process according to claim 2, wherein filtration, crystallization, and solvent removal are enhanced by the use, as a diluent and wash liquid, of a hydrocarbon which is unreactive with the anhydride, a solvent for the phenyl ether, boils above 60° C., and is liquid at 20° C.

4. Process according to claim 3, wherein said diluent and wash liquid is benzene.

5. Process according to claim 3, wherein said diluent and wash liquid is toluene.

6. Process according to claim 3, wherein said diluent and wash liquid is a petroleum hydrocarbon cut boiling at 60–90° C. at atmospheric pressure.

7. Process according to claim 1, wherein said aromatic acid is trimellitic acid.

8. Process according to claim 1, wherein said aromatic acid is bis(3,4-dicarboxylphenyl)sulfone.

9. A process of claim 1 in which the aromatic acid is pyromellitic acid and the mixture of pyromellitic acid and phenyly ether is heated at a temperature of from 210–260° C.

10. Process according to claim 9, wherein the solid impurities are filtered from the phenyl ether-pyromellitic dianhydride solution above about 230° C. and the dianhydride is crystallized from the solution upon cooling.

11. The process according to claim 9, wherein a hydrocarbon selected from the group consisting of benzene, toluene and a petroleum hydrocarbon cut boiling at 60–90° C. is added to the phenyl ether-dianhydride filtrate to enhance crystallization of the dianhydride, and an additional amount of said hydrocarbon is used as wash liquid to remove phenyl ether from the dianhydride crystals.

References Cited in the file of this patent

UNITED STATES PATENTS

| | | |
|---|---|---|
| 2,250,091 | Campbell et al. | July 22, 1941 |
| 2,578,326 | Toland | Dec. 11, 1951 |
| 2,753,373 | Hutchings et al. | July 3, 1956 |
| 2,888,465 | Hodes | May 26, 1959 |

OTHER REFERENCES

Migrdichian: Organic Syntheses, volume II (1957), page 1403.